Patented Apr. 17, 1951

2,549,587

UNITED STATES PATENT OFFICE 2,549,587

PROCESS FOR CONCENTRATION OF ACETIC ACID

Jaroslav Fiala, Batizovce, and Tomáš Ždichynec, Zlin, Czechoslovakia, assignors to "Bata, Narodni podnik," Zlin, Czechoslovakia No Drawing. Application March 6, 1947, Serial No. 732,940. In Germany October 17, 1941

6 Claims. (Cl. 260—541)

When manufacturing vinylacetate by introducing of acetylene into waterfree acetic acid in the presence of catalysts a considerable amount of ethylidendiacetate is produced that up to now has been changed through catalytic influence of concentrated sulphuric acid or zinc chloride into acetanhydride and acetaldehyde. The reaction does not proceed smoothly. The decomposition is not complete. The reaction yields a maximum of 50% acetanhydride whereby tar like byproducts are being formed.

It has been found that ethylidendiacetate when boiled with water or diluted acids, splits smoothly into acetic acid and acetaldehyde. This reaction can be used, according to the invention, for the concentration or water elimination from diluted, water containing acetic acid. The acetaldehyde can, if necessary, be in the customary way eliminated and utilized.

The new method has the special advantage that the technical diluted acetic acid is concentrated in a more simple and cheaper way whereby at the same time the ethylidendiacetate, forming a byproduct of the production of vinylacetate from the acetic acid, can be utilized without losses. It is possible to obtain smoothly and simply concentrated acetic acid or even glacial acetic acid. No tar like byproducts are produced as with the known process. The cost of the concentration of acetic acid is small in comparison to other used methods, like rectification or extraction. Ethylidendiacetate is at the same time utilized without losses. The process is therefore especially suitable for production of vinylacetate.

Example 1

146 parts of ethylidendiacetate and 98.5 parts of 80% acetic acid are boiled for some time. Advantageously traces of concentrated sulphuric acid are added. The acetaldehyde that is produced escapes in form of steam and can be obtained as such or as paraldehyde and utilized in the usual way. After finished reaction the produced waterfree acetic acid (eventually other carbonic acid) is obtained by distillation. The yield is practically quantitative; in the distillation container only a barely measurable amount of tar like, eventually coke like residuum is remaining.

Example 2

Technical glacial acetic acid with about 2% water and 2% of admixtures of organic character, for instance butyric acid is treated in the same way as in Example 1. The amount of ethylidendiacetate is measured according to the equation $$H_2O + CH_3.CH/CH_3COO/_2 = CH_3CHO + 2CH_3COOH$$

i. e. for 100 parts technical glacial acid 16 parts of ethylidendiacetate are used. The method of manufacturing and the results are the same as in Example 1.

We claim:

1. Method of increasing the concentration of acetic acid containing water by mixing the same with ethylidendiacetate and heating the thus obtained mixture.

2. Method of increasing the concentration of acetic acid containing water by mixing the same with ethylidendiacetate and boiling the thus obtained mixture.

3. Method of increasing the concentration of acetic acid containing water by mixing the same with ethylidendiacetate and heating the thus obtained mixture in the presence of a small percentage of sulphuric acid.

4. Method of increasing the concentration of acetic acid containing water by mixing the same with ethylidendiacetate and boiling the thus obtained mixture in the presence of traces of sulphuric acid.

5. Method of increasing the concentration of acetic acid containing water by mixing the same with ethylidendiacetate; heating the thus obtained mixture; and distilling the thus heated mixture.

6. Method of increasing the concentration of acetic acid containing water by mixing the same with ethylidendiacetate; boiling the thus obtained mixture; and distilling the thus boiled mixture.

JAROSLAV FIALA.
TOMÁŠ ŽDICHYNEC.

REFERENCES CITED

The following references are of record in the file of this patent:

UNITED STATES PATENTS

| Number | Name | Date |
|---|---|---|
| 1,843,434 | Wietzel | Feb. 2, 1932 |

FOREIGN PATENTS

| Number | Country | Date |
|---|---|---|
| 284,996 | Germany | Jan. 20, 1914 |
| 739,375 | Germany | Aug. 12, 1943 |

OTHER REFERENCES

Karrer, "Organic Chemistry" (Nordeman Pub. Co., N. Y.), pp. 188–189 and 198 (1938).